(12) United States Patent
Felser et al.

(10) Patent No.: US 12,054,832 B2
(45) Date of Patent: Aug. 6, 2024

(54) ELECTROCATALYSTS FOR HYDROGEN EVOLUTION REACTIONS (HER) WITH DELAFOSSITE OXIDES $ABO_2$

(71) Applicant: MAX PLANCK GESELLSCHAFT ZUR FÖRDERUNG DER WISSENSCHAFTEN EV, Munich (DE)

(72) Inventors: Claudia Felser, Halle (DE); Guowei Li, Dresden (DE); Andrew MacKenzie, Dresden (DE); Seunghyun Khim, Dresden (DE)

(73) Assignee: MAX PLANCK GESELLSCHAFT ZUR FÖRDERUNG DER WISSENSCHAFTEN EV, Munich (DE)

( * ) Notice: Subject to any disclaimer, the term of this patent is extended or adjusted under 35 U.S.C. 154(b) by 0 days.

(21) Appl. No.: 17/279,489

(22) PCT Filed: Sep. 19, 2019

(86) PCT No.: PCT/EP2019/075151
§ 371 (c)(1),
(2) Date: Mar. 24, 2021

(87) PCT Pub. No.: WO2020/064500
PCT Pub. Date: Apr. 2, 2020

(65) Prior Publication Data
US 2021/0388516 A1    Dec. 16, 2021

(30) Foreign Application Priority Data
Sep. 26, 2018 (EP) .................................. 18196868

(51) Int. Cl.
*C25B 11/081* (2021.01)
*B01J 23/652* (2006.01)
(Continued)

(52) U.S. Cl.
CPC ........... *C25B 11/081* (2021.01); *B01J 23/652* (2013.01); *B01J 23/8913* (2013.01); *C25B 1/04* (2013.01)

(58) Field of Classification Search
CPC ...... B01J 23/652; B01J 23/6522; B01J 23/62; B01J 23/63; B01J 23/8913; C25B 11/081; C25B 1/04
(Continued)

(56) References Cited

U.S. PATENT DOCUMENTS 3,804,740 A * 4/1974 Welch .................. C25B 11/073
204/291
3,910,828 A * 10/1975 Welch .................. C25B 11/075
205/625
(Continued)

FOREIGN PATENT DOCUMENTS

CN 101838011 A * 9/2010 ............... C01G 3/00
CN 102730741 A * 10/2012 ............... C01G 3/00
(Continued)

OTHER PUBLICATIONS

F. Saib et al., "Photo-electrochemical properties of p-type $AgCoO_2$ prepared by low temperature method." Materials Science in Semiconductor Processing 91, pp. 174-180. (Year: 2019).*
(Continued)

*Primary Examiner* — Patricia L. Hailey
(74) *Attorney, Agent, or Firm* — ProPat, LLC; Cathy R. Moore (57) ABSTRACT

The present invention refers to material that includes a compound of the formula $ABO_x$ wherein X is >1.5 and ≤2.5, A is independently selected from a transition metal of IUPAC groups 10 and 11, and B is independently selected from a transition metal of IUPAC group 6, 7, 8 or 9 or a main
(Continued)

group element of IUPAC group 13, as highly active catalyst for a hydrogen evolution reaction (HER).

13 Claims, 9 Drawing Sheets

(51) Int. Cl.
 *B01J 23/89* (2006.01)
 *C25B 1/04* (2021.01)
(58) Field of Classification Search
 USPC .............................. 502/326, 327, 330, 339
 See application file for complete search history.

(56) References Cited

U.S. PATENT DOCUMENTS

| | | | |
|---|---|---|---|
| 4,748,144 | A | 5/1988 | Monnier et al. |
| 5,759,947 | A * | 6/1998 | Zhou .................... B01D 53/865 |
| | | | 502/304 |
| 6,979,435 | B1 * | 12/2005 | Shahriari ................. C01G 1/00 |
| | | | 423/263 |
| 2002/0183200 | A1 | 12/2002 | Sato et al. |
| 2008/0112870 | A1 | 5/2008 | Moini et al. |
| 2009/0321244 | A1 | 12/2009 | Smith et al. |
| 2012/0145532 | A1 | 6/2012 | Smolyakov et al. |
| 2015/0010463 | A1 | 1/2015 | Bao et al. |

FOREIGN PATENT DOCUMENTS

| | | | | |
|---|---|---|---|---|
| EP | 2127731 | A1 | 12/2009 | |
| EP | 2407419 | A1 | 1/2012 | |
| GB | 1400948 | A * | 7/1975 | ......... C25B 11/0442 |
| JP | 2002255548 | A * | 9/2002 | ............ B01D 53/14 |
| JP | 2004-292188 | A * | 10/2004 | ............ C01B 13/18 |
| JP | 2004292188 | A | 10/2004 | |
| JP | 2019163508 | A * | 9/2019 | ............ B22D 25/04 |

OTHER PUBLICATIONS

N. Koriche et al., "Photocatalytic hydrogen evolution over delafossite CuAlO2." International Journal of Hydrogen Energy 30, pp. 693-699. (Year: 2005).*
András Varga et al., "Rapid synthesis of interconnected CuCrO2 nanostructures: A promising electrode material for photoelectrochemical fuel generation." Electrochimica Acta 272, pp. 22-32. (Year: 2018).*
Jing Gu et al., "p-Type CuRhO2 as a Self-Healing Photoelectrode for Water Reduction under Visible Light." Journal of the American Chemical Society, 136, 3, pp. 830-833. (Year: 2013).*
Ana Korina Diaz-Garcia et al., "Sol-gel copper chromium delafossite thin films as stable oxide photocathodes for water splitting." Journal of Materials Chemistry A, 3, pp. 19683-19687. (Year: 2015).*
S. Saadi et al., "Photocatalytic hydrogen evolution over CuCrO2." Solar Energy, 80, pp. 272-280. (Year: 2006).*
Carrie G. Read et al., "Electrochemical Synthesis of p-Type CuFeO2 Electrodes for Use in a Photoelectrochemical Cell." The Journal of Physical Chemistry Letters, 3, pp. 1872-1876. (Year: 2012).*
Yi Ma et al., "Photoelectrochemical Properties of CuCrO2: Characterization of Light Absorption and Photocatalytic H2 Production Performance." Catalysis Letters, 144, pp. 1487-1493. (Year: 2014).*
J. Ahmed et al., "Delafossite CuAlO2 Nanoparticles with Electrocatalytic Activity toward Oxygen and Hydrogen Evolution Reactions," ACS Symposium Series, Jan. 1, 2015, American Chemical Society/Oxford University Press, vol. 1213, pp. 57-72.
P. F. Carcia et al., "O2 Electrocatalysis on Thin Film Metallic Oxide Electrodes with the Delafossite Structure," Chemischer Informationsdienst, Jan. 6, 1981, vol. 127, No. 9, pp. 1974-1978.
M. Tanaka et al., "Crystal growth of PdCoO2, PtCoO2 and their solid-solution with delafossite structure," Journal of Crystal Growth, 1997, vol. 173, No. 3, pp. 440-445.
International Search Report for corresponding PCT/EP2019/075151.
Y. Kim, et al. "Photoelectrochemical Water Splitting on a Delafossite CuGaO2 Semiconductor Electrode," Bull. Korean Chem. Soc. 2014, vol. 35, No. 11, pp. 3261-3266.
M. Trari, et al., "Photocatalytic hydrogen evolution over delafossite CuAlO2," International Journal of Hydrogen Energy, 2005, vol. 30, pp. 693-699.

* cited by examiner

ELECTROCATALYSTS FOR HYDROGEN EVOLUTION REACTIONS (HER) WITH DELAFOSSITE OXIDES ABO$_2$

CROSS-REFERENCE TO RELATED APPLICATIONS

This application is being filed under 35 U.S.C. § 371 as a National Stage Application of pending International Application No. PCT/EP2019/075151 filed Sep. 19, 2019, which claims priority to the following parent application: European Patent Application No. 18196868.6, filed Sep. 26, 2018. Both International Application No. PCT/EP2019/075151 and European Patent Application No. 18196868.6 are hereby incorporated by reference herein in their entirety.

FIELD OF THE INVENTION

The present invention is directed to Hydrogen Evolution Reaction (HER) catalysts.

BACKGROUND

The global energy challenge is universal, and a transfer to alternative sustainable energy sources, in particular the sun, is inevitable. Since solar energy is only available during day-time it would be highly advantageous to store the energy in an appropriate manner. Storage in the form of hydrogen would be a very attractive way to realize this. Moreover, hydrogen is believed to be an ideal substitute to the fossil fuel energies such as coal and oil due to its zero emission of harmful and global warming gases. In addition, hydrogen has the highest energy per mass of any fuel; it reaches 142 MJ/kg.

An ideal process for hydrogen production is to use water as a hydrogen source together with electricity or sunlight for conversion. Accordingly, photo/electrocatalytic water splitting has attracted attention as one of the most promising hydrogen production processes. Nevertheless, the development of highly active photo/electrocatalysts for water splitting was hampered for a long time because of the difficulty of working with the thermodynamically uphill reaction. Unfortunately, catalysts, especially noble metals such as Platinum, are needed to speed the hydrogen evolution reaction (HER) kinetics, which limits the widespread application of this technology.

Another research focus is on improving the existing materials by either engineering suitable structures, increasing the surface area e.g. by nano-structuring, doping, straining, or edging, or using co-catalysts to increase a given material's efficiency. Current strategies for the catalyst design focus on increasing the number and activity of local catalytic sites, such as the edge sites of molybdenum disulfides (MoS$_2$) in the Hydrogen Evolution Reaction. However, the electrocatalysts obtained from aforementioned strategies are often highly complex with uncertain exposed crystal surface and high density of defects, which bring more problems such as the difficulties in controlling active sites. In addition, the improvement of electrocatalytic activity by increasing the density of active sites with these strategies is very limited.

PRIOR ART

U.S. Pat. No. 4,748,144A discloses a mixed oxide that has a delafossite type of crystal lattice structure for the conversion of synthesis gas to linear alcohols and aldehydes. The mixed oxide can be represented by the formula: $Cu_xM_aFe_bO_{2x}$, wherein M is selected from the group consisting of Cr and Al and a, and b is equal to or almost equal to x.

EP2127731A1 provides a hydrothermal treatment to NaAlO$_2$ and Ag$_2$O to obtain delafossite-type AgAlO$_2$ material. The material can be used as catalyst for burning carbon without corroding a supporting honeycomb structure.

US2008/0112870A1 provides a precious metal elements free compound for ammonia (NH$_3$) and carbon oxide (CO) oxidation. The compound comprises an (earth)alkali component (Mg, Ba, or K), a transition metal (V, Cr, Mo, Mn, Fe, Co, Ni, Cu, Zn, Ag, or combinations thereof), and a metal oxide support.

US20090321244A1 discloses a photocatalyst including an element selected from Cu, Al, Ti, Ga, Cd, Zn, W, Fe, Sn, Si, In or any combination thereof. Exemplary catalyst compounds include CuAlO$_2$, TiO$_2$, CuO, Cu$_2$O, NiO, GaAs, GaP, CdSe, ZnO, WO$_3$, Fe$_2$O$_3$, SnO$_3$, SiC, CuGaO$_2$, and CuInO$_2$ or any combination thereof. It can convert water into hydrogen and oxygen, and more particularly convert water into hydrogen and oxygen using sunlight.

M. Trari, et al. *International Journal of Hydrogen Energy*, 2004, reported the synthesis of delafossite CuAlO$_2$. It can be used as photocatalyst for hydrogen evolution. But it only works at alkaline media and no photoactivity was observed below pH 7.

Y. Kim, et al. Bull. Korean Chem. Soc. 2014 reported the synthesis of polycrystalline CuGaO$_2$ pellets with a delafossite structure from Ga$_2$O$_3$ and CuO by high temperature solid-state synthesis. With the synthesized CuGaO$_2$ pellets as a photoelectrode, the photoelectrochemical water reduction to molecular hydrogen was demonstrated at a higher potential than the flat-band potential under UV light illumination.

EP-2 407 419-A1 describes a solution by separating an oxygen evolution photocatalyst and a hydrogen evolution photocatalyst by an electrically conductive separator layer.

US-A-2012/0145532 discloses the use of wide-spectrum excitation of noble metal core/semiconductor shell hybrid nanoparticles for unassisted photocatalytic splitting of water. The metal core/semiconductor shell composite nanoparticles comprise a noble metal (e.g. Au, Ag, Pt, Pd, or noble metal alloy) core which is coated with a wide-bandgap semiconductor photocatalyst (e.g. TiO$_2$, ZnS, Nb$_2$O$_5$) transparent to optical excitation in the visible and near-infrared (NIR) spectral ranges, consistent with plasmon absorption bands of the metal core.

US-A-2015/0010463 relates to a photocatalyst for generating hydrogen from water using visible light irradiation comprising nanocrystalline cobalt (II) oxide nanoparticles.

OBJECT OF THE INVENTION

It was an object of the present invention to provide more affordable and more efficient catalysts for the Hydrogen Evolution Reaction (HER). It was a specific object of the invention to increase the intrinsic electrochemical activities by optimizing the conductivity and carrier mobility of the catalysts for HER. This would facilitate the electron transfer between the catalysts surface and the adsorbates, which in turn would speed-up the reaction kinetics of the HER. At the same time the catalysts should have high catalytic activity for HER, so that they can be used for large scale hydrogen production. It would be preferable to provide catalysts which come as close as possible to the most efficient catalysts such as e.g. Pt which only needs an overpotential of 30 mV to deliver a current density of 10 mA cm$^{-2}$. Moreover, the cost for such catalysts should be lower than that of known catalysts, specifically lower that pure Platinum. Additionally, the catalysts should exhibit a high chemical stability and durability to allow for a stable and extended lifetime of the photo/electrochemical cells, so that they can produce hydrogen continuously for days or even months.

SUMMARY OF THE INVENTION

The present invention provides HER catalytic material comprising compounds of delafossite oxides of the structure ABOx, herein referred to as formula (I). In formula (I)
x is between 1.5 and 2.5, and preferably 2;
A is independently selected from a transitional metal of IUPAC of group 10 and 11; and
B is independently selected from a transition metal of IUPAC group 6, 7, 8 or 9 or a main group element of IUPAC group 13. The invention further provides a simple route for the economic and large-scale production of these delafossite oxides of formula (I).

The catalysts can be used directly as an electrode for hydrogen reduction in the photo/electrochemical cell. The catalysts show remarkable performance in acidic media, with low overpotentials, and excellent stability over time. The catalysts according to the present invention work at a much lower overpotential than pure Pt at large current densities.

DETAILED DESCRIPTION OF THE INVENTION

The present invention is directed to HER catalytic material comprising compounds of delafossite structure of the formula (I) below:

ABOx wherein
x is >1.5 and ≤2.5,
A is independently selected from a transition metal of IUPAC groups 10 and 11, and
B is independently selected from a transition metal of IUPAC group 6, 7, 8 or 9 or a main group element of IUPAC group 13.
In a preferred embodiment
X is 2, and
A is independently selected from: Pt, Pd, or Ag, and
B is independently selected from: Co, Al, Cr, Fe, In, Nd or Rh.

Most preferred are the delafossite oxide compounds $PdCoO_2$ and $PtCoO_2$. $PdCoO_2$ and $PtCoO_2$ have a layered structure and crystallize in a rhombohedral space group, which is built by an alternating stacking of [A] layers and [$BO_2$] slabs along the c-axis. Most delafossite oxides are insulators, but some, e.g. $PdCoO_2$, $PdCrO_2$, or $PtCoO_2$, are good metals. The in-plane conductivities at room temperature are only about 3 μΩcm, which is even higher than that of pure metals such as Pd, Cu, and Au. However, their carrier density is approximately $1.6*10^{22}$ cm$^{-3}$. This is a factor of three lower than that of a 3d transition metal. This results in a long mean free path length of up to 0.6 nm, which is the longest of any known large carrier density metal. Considering that the "B"-elements are much cheaper than Platinum, and oxygen is free, the cost of catalysts can be decreased by as much as 75%. Yet, the HER activity is even higher than that of pure Platinum at high working current densities of >10 mA cm$^{-2}$.

The delafossite oxide catalysts according to the present invention can be manufactured e.g. by mixing an "A"-halide, such as chloride, bromide or iodide, with a "B"-oxide, preferably by co-grinding the two compounds, preferably in an inert gas (e.g. $N_2$, Ar) atmosphere for 10 to 60 minutes. The mixed powder is then heated to 600-1000° C., preferably 700-900° C., most preferred to about 800° C. for 3-8 hours, preferably 4-7 hours, most preferred for about 5 hours and then cooled down to 20-100° C., preferably 40-80° C., most preferred to 50-70° C. below the highest heating temperature at a cooling rate of 5-10° C./hour, preferably 6-8° C./hour, most preferred about 7° C./hour and then kept at this temperature for 10-50 hours, preferably 20-40 hours, most preferred about 30 hours. Finally, the composition is cooled to room temperature at a rate of 70-120° C./hour, preferably 80-100° C./hour, most preferred at about 90° C./hour. This reaction is preferably performed in a sealed tube, e.g. a quartz tube, preferably under reduced pressure of between $10^{-3}$ and $-10^{-4}$ Pa.

General Properties

The electrocatalysts of the present invention exhibits a very low resistivity at room temperature, which is in the range of 0.05-3 μΩcm in the temperature range of 5-300 K. This facilitates easy electron transfer between the catalyst and electrolyte. Moreover, the present electrocatalysts show higher activity under acidic conditions than Pt foil. The overpotential to deliver a current density of 10 mA/cm$^2$ is only 33 mV. The Tafel slope is as low as 30 mV/dec. in acidic (pH=0) medium. All these values are lower than that of Pt foil (71 mV @10 mA/cm$^2$ with Tafel slope of 74 mV/dec.), and even comparable with nano Pt/C catalysts (28 mV @10 mA/cm$^2$ with Tafel slope of 34 mV/dec.). The exchange current density is determined to be 0.795 mA/cm$^2$, which is higher than that of Pt/C catalyst with a value of 0.518 mA/cm$^2$. The high chemical stability and electrochemical activity of the electrocatalyst do not change even after the compounds have been exposed to air for 3 months.

The electrocatalyst of the present invention consists of a compound with delafossite structure of the ABOx, wherein x is >1.5 and ≤2.5, A is independently selected from a transition metal of IUPAC groups 10 and 11, and B is independently selected from a transition metal of IUPAC group 6, 7, 8 or 9 or a main group element of IUPAC group 13. For example, the ABOx, compound can be grown on a conductive substrate such as Ni foam, carbon cloth, or can be mixed with graphene to increase the mobility and conductivity. However, it has surprisingly been found that the present ABOx, compounds can be used in single crystal form directly as a working electrode. In this case the electrode has a size of about 0.5 to 1.5×0.5 to 3.0×0.05 to 1.0 mm$^3$, preferably about 1×2×0.1 mm$^3$. The single crystal electrode can then be attached to a wire, e.g. Cu wire, e.g. with silver paint.

Example

The invention is explained in more detail below with reference to examples.

Powders of reagent-grade PdCl$_2$ (99.99+% purity; Alfa Aesar) and CoO (99.995% purity; Alfa Aesar) were ground together for about one hour under an inert gas atmosphere. The mixed powder was then sealed in a quartz tube under a vacuum of 5×10$^{-4}$ Pa. The sealed quartz tube was heated in a vertical furnace to 800° C. for 5 hours and cooled down to 740° C. at a rate of 7.5° C./hour and kept at this temperature for 30 hours. Finally, the furnace was cooled from 740° C. to room temperature at a rate of 90° C./hour.

Analytical Methods

X-ray powder diffraction patterns were obtained from a D8 ADVANCE™ X-ray diffractometer (Bruker, AXS) using Cu Kα, radiation. The microstructure of the samples was examined by scanning electron microscope (SEM, FEI QUANTA™ 200 F) with capabilities for energy dispersive X-ray spectroscopy (EDX). Transport measurements were performed using standard four-probe ac techniques in $^4$He cryostats (Quantum Design).

HER catalytic measurements were performed on the Autolab PGSTAT302N with impedance module electrochemistry workstation with a conventional three electrode cell configuration. A Ag/AgCl (3 M KCl) electrode was used as the reference electrode, and a graphite rod was used as the counter electrode. The electrolyte was 0.5 M H$_2$SO$_4$ solution and purified by Ar before use. Linear sweep voltammograms were recorded using a PdCoO$_2$ single crystal electrode with a scan rate of 1 mV/S. Stability tests were carried out at a current density of 50 mA/cm$^2$ in the initial test for 24 hours. To check the chemical stability of the catalyst, the same measurement was repeated again after exposing the crystal to air for two weeks. All potentials were referenced to a reverse hydrogen electrode (RHE).

Composition and Structure

Figure 1:
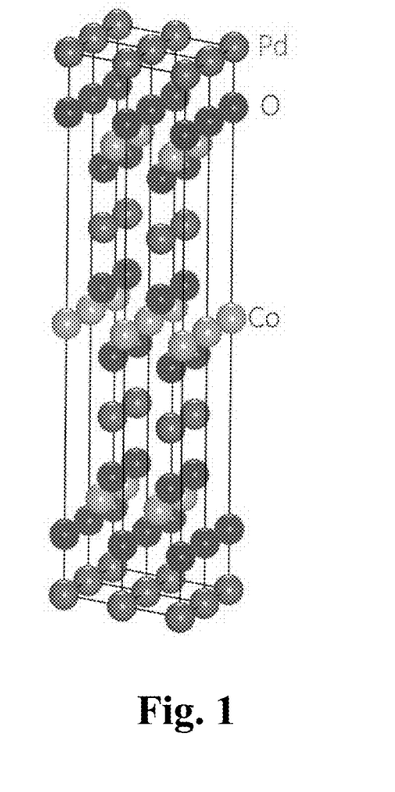
FIG. 1: Crystal structure of $PdCoO_2$.

PdCoO$_2$ single crystals were synthesized and separated from unreacted CoO and from CoCl$_2$ powder by cleaning the product with boiling alcohol. FIG. 1 shows the crystal structure of PdCoO$_2$. It is constructed from two-dimensional layers with the edge-linked CoO$_6$ octahedra connected by O—Pd—O dumbbells. The Co atoms in the octahedral site of PdCoO$_2$ are in a nonmagnetic low-spin state. It is rhombohedral with space group R −3 m (space group no. 166).

Figure 2:
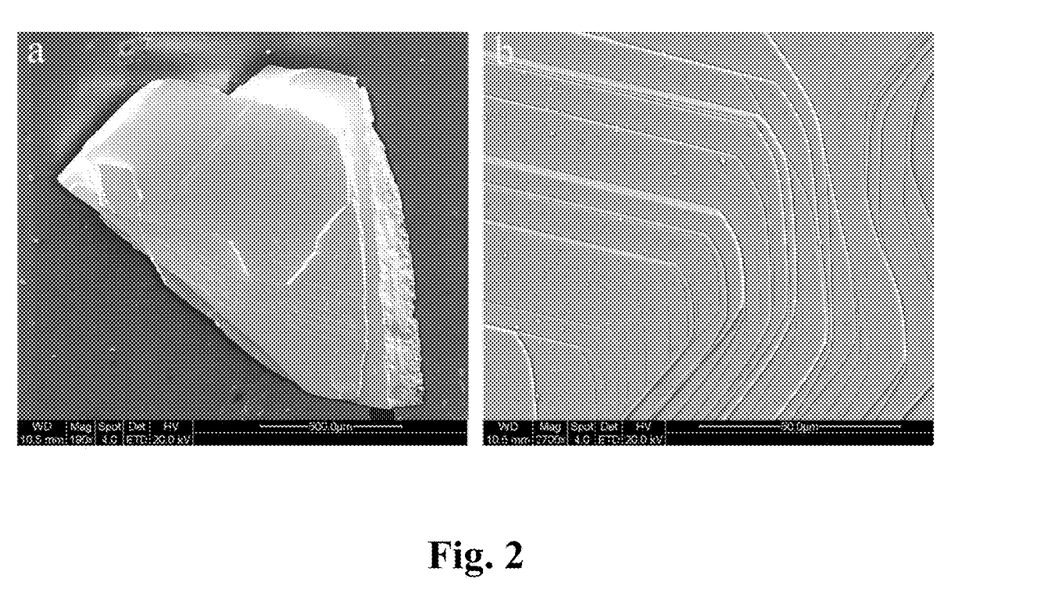
FIG. 2a: SEM image of $PdCoO_2$ single crystal.
FIG. 2b: Magnified SEM image of $PdCoO_2$ single crystal.

FIG. 2a shows the SEM image of a typical PdCoO$_2$ single crystal. The crystal has a flat surface with metallic luster. The sharp steps can be seen clearly from FIG. 2b on the crystal surface, indicating the lateral growth and the layered structure. This means that the exposed flat surface is the a-b plane and constructed alone the c-axis.

Figure 3:
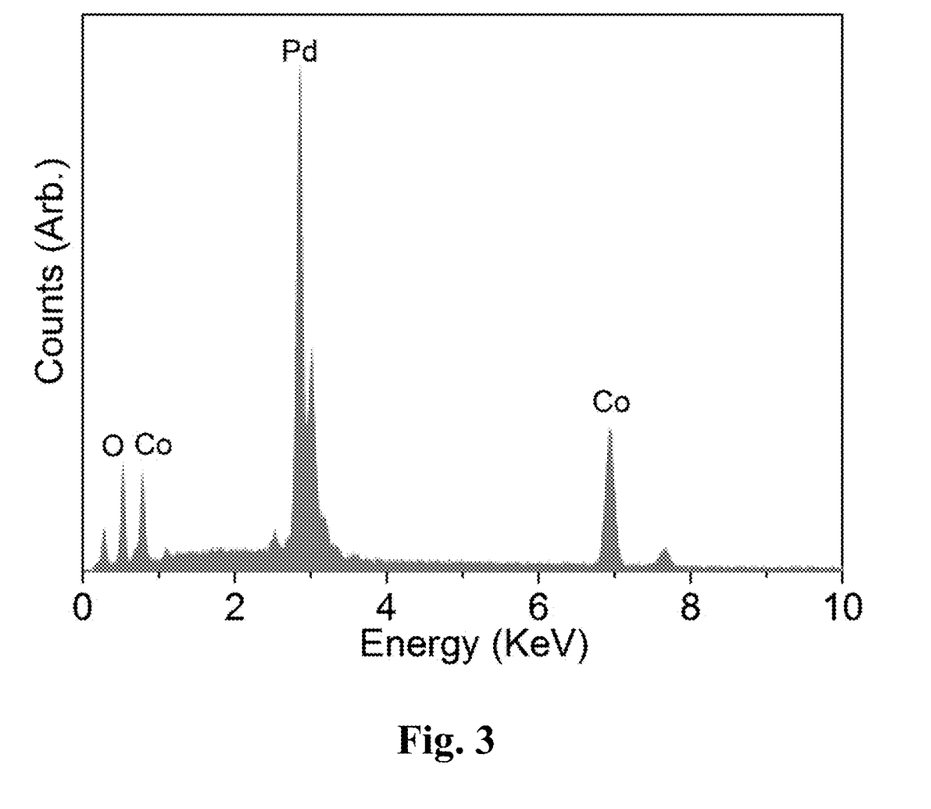
FIG. 3: EDS analysis of the single crystal.

FIG. 3 shows the EDS spectra of the investigated crystal. The chemical composition was determined to be Pt, Co and O with stoichiometry ratio of close to 1:1:2, further indicating the high purity of the synthesized crystal.

Physical Transport Properties

Figure 4:
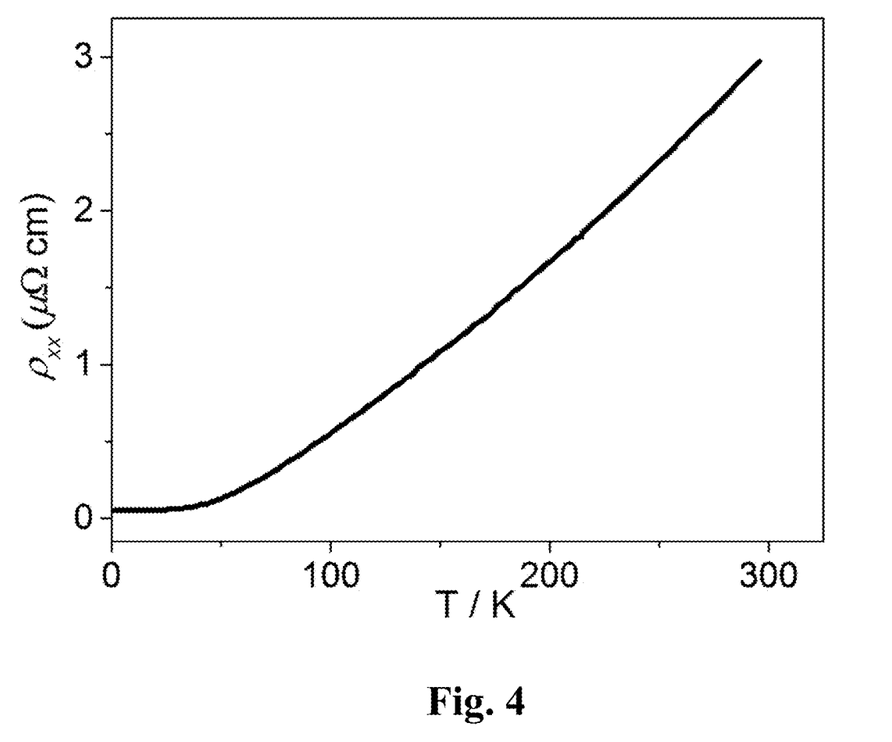
FIG. 4: Temperature dependence of resistivity of $PdCoO_2$ single crystal.

FIG. 4 shows the in-plane temperature dependence of electrical resistivity of the single crystal. The resistivity decreases with decreasing temperature over the whole temperature range, suggesting the metallic behavior. The resistivity at room temperature is only 2.1 μΩcm, which is lower than all the reported oxide metals. The residual resistivity ratio ρ300K/ρ15K is typically 50 to 60, indicating the high purity of the sample.

Electrocatalytic Activity Assessment

Figure 5:
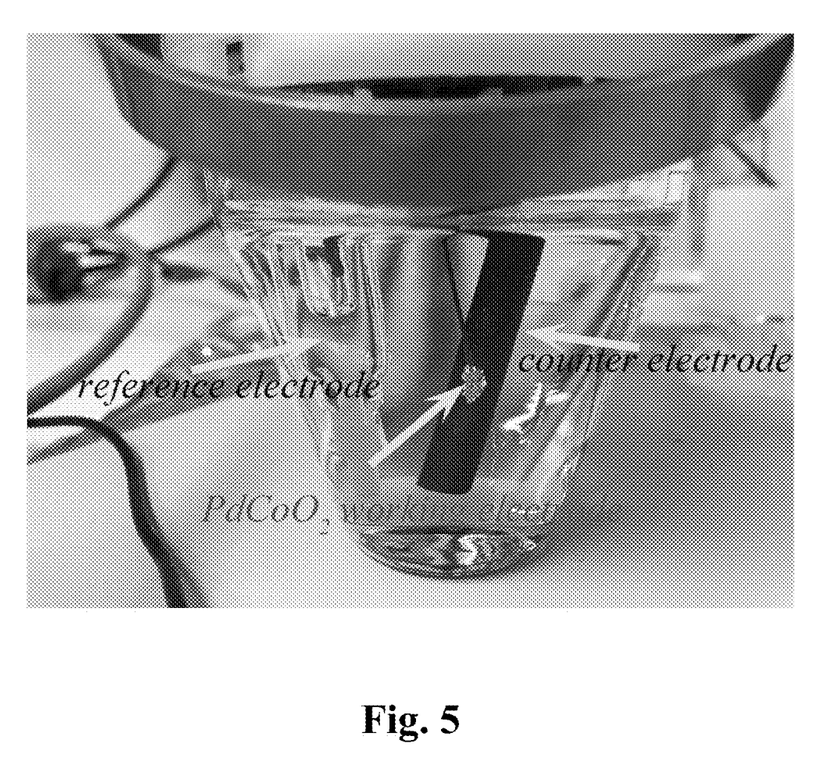
FIG. 5: Picture of the electrocatalysis system.

FIG. 5 shows the three electrode electrocatalysis system. The PdCoO$_2$ single crystal was attached on the Cu wire with silver paint and used as working electrode directly. 0.5 M H$_2$SO$_4$ solution was used as electrolyte and purified with Ar gas for 30 minutes before the measurement. The surface area of the single crystal was determined to be about 0.008 cm$^2$.

Figure 6:
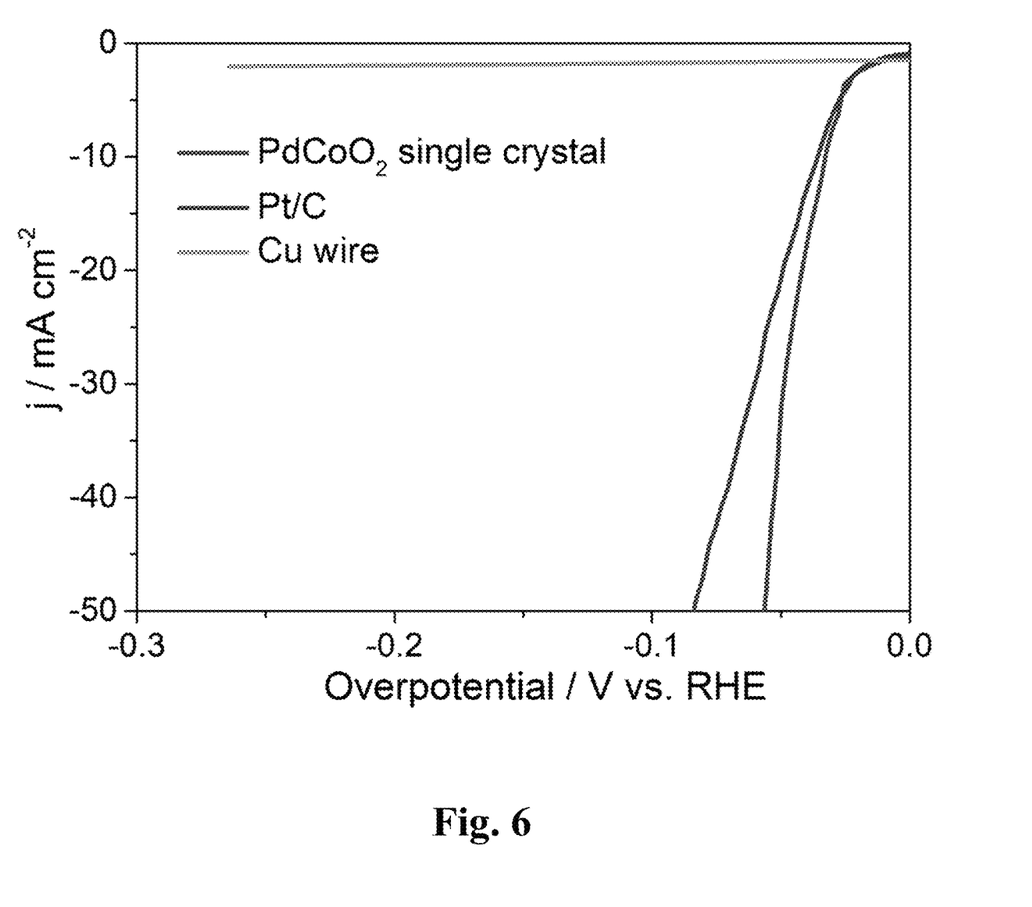
FIG. 6: HER polarization curves of Cu wire, 20% Pt/C, and $PdCoO_2$ single crystal.
Figure 7:
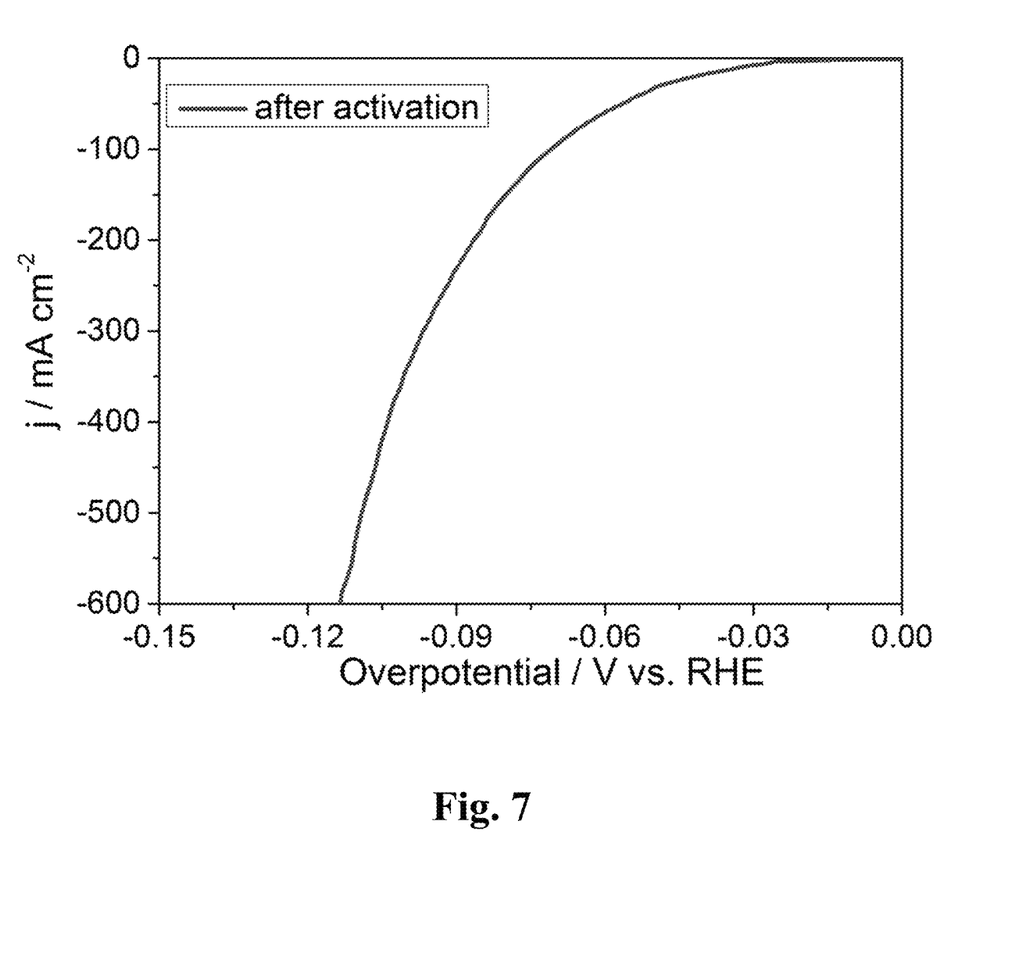
FIG. 7: Polarization curve in a large applied potential window.

The HER polarization curves for Cu wire, commercial Pt/C, and PdCoO$_2$ electrocatalysts are shown in FIG. 6. It can be seen that Cu wire is not active in the measurement potential scale. The commercial Pt/C needs an overpotential of 30 mV to deliver a current density of 10 mA/cm$^2$. The value for the PdCoO$_2$ single crystal is only 33 mV. More interestingly, the overpotential to deliver a bigger current density is much lower for PdCoO$_2$. FIG. 7 shows the polarization curve for PdCoO$_2$ in a larger potential window. It only needs an overpotential of 112 mV to achieve a current density of 600 mA/cm$^2$.

Figure 8:
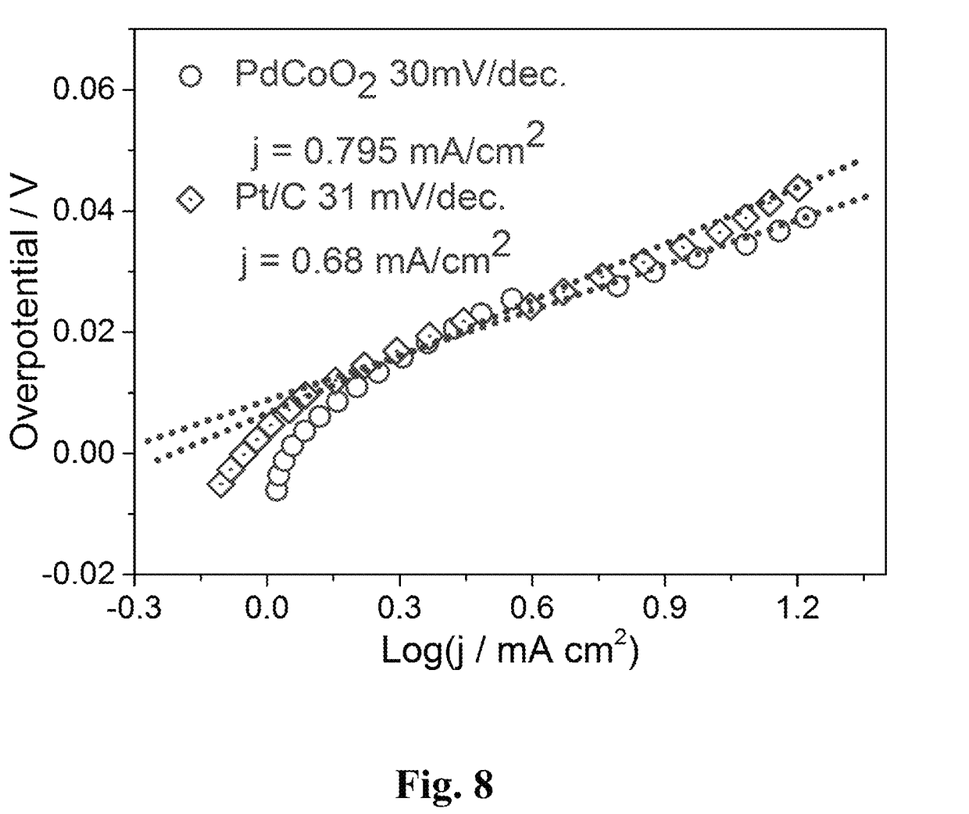
FIG. 8: Tafel plots of 20% Pt/C, and $PdCoO_2$ single crystal.

Tafel slope and exchange current density were obtained by fitting the experiment data with the Butler-Volmer equation (FIG. 8). The Tafel slope of the Pt/C and PdCoO$_2$ are 32 and 30 mV/dec., respectively. The exchange current density was 0.795 mA/cm$^2$ for PdCoO$_2$, which is also higher than that of Pt/C (0.68 mA/cm$^2$). These experimental data unequivocally demonstrate that the PdCoO$_2$ is a highly active HER catalyst.

Figure 9:
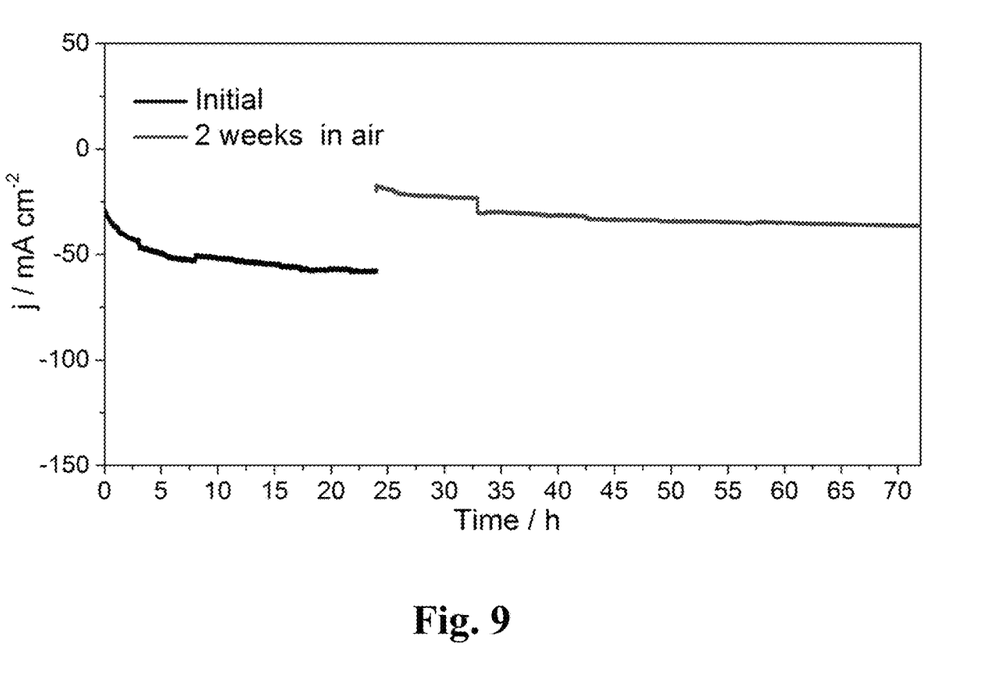
FIG. 9: Current-time (I-t) chronoamperometric response of $PdCoO_2$ electrocatalyst at an overpotential of 50 mV in the initial test, and 40 mV after exposed in air for two weeks.

The long-term chemical and electrochemical stability were tested and shown in FIG. 9. With an overpotential of 50 mV, the catalysts deliver a current density of about 50 mA/cm$^2$ and kept stable for 24 hours. The single crystal was exposed to air for 2 weeks and the same measurement was repeated. The electrode could work stably in 48 h with overpotential of 50 mV. This indicates the excellent stability of the single crystalline catalyst.

The invention claimed is:

1. A hydrogen evolution reaction (HER) reduction catalyst comprising a compound of the formula (I):

ABOx           (I)

wherein
   x is >1.5 and ≤2.5,
   A is independently selected from a transition metal of IUPAC group 10, and
   B is independently selected from a transition metal of IUPAC group 6, 7, 8 or 9.

2. The reduction catalyst according to claim 1, wherein x is 2, and
A is independently selected from: Pt or Pd and
B is independently selected from: Co, Cr, Fe, Nd or Rh.

3. The reduction catalyst according to claim 1, wherein the compound is
PdCoO$_2$ or PtCoO$_2$.

4. A process for the manufacture of a compound according to claim 1, having the formula (I):

ABOx           (I)

wherein
   x is >1.5 and ≤2.5,
   A is independently selected from a transition metal of IUPAC group 10, and
   B is independently selected from a transition metal of IUPAC group 6, 7, 8 or 9;

said process comprising
mixing an "A"-halide with a "B"-oxide and
heating the mixture to 600-1000° C.

5. The reduction catalyst according to claim 1, wherein the compound consists of single crystals.

6. A hydrogen evolution reaction (HER) reduction catalyst comprising a compound of the formula (I):

$$ABOx \qquad (I)$$

wherein
x is >1.5 and ≤2.5,
A is independently selected from Pt, Pd or Ag, and
B is independently selected from a transition metal of IUPAC group 6, 7, 8 or 9; and
the compound delivers a current density of 10 mA/cm$^2$ with an overpotential of 33 mV.

7. The reduction catalyst according to claim 6, wherein the compound is either grown on a conductive substrate or is a single crystal.

8. The reduction catalyst according to claim 7, wherein said single crystal has a size of about 0.5 to 1.5×0.5 to 3.0×0.05 to 1.0 mm$^3$.

9. The reduction catalyst according to claim 7, wherein said single crystal is PdCoO$_2$ having a surface area of about 0.008 cm$^2$.

10. The reduction catalyst according to claim 9, wherein said single crystal of PdCoO$_2$ exhibits a current density of 600 mA/cm$^2$ at an overpotential of 112 mV.

11. The reduction catalyst according to claim 6, wherein the compound is
PdCoO$_2$, PdCrO$_2$ or PtCoO$_2$
and the compound has an in-plane conductivity of about 3 μΩcm and a carrier density of about 1.6×10$^{22}$ cm$^{-3}$.

12. A hydrogen evolution reaction (HER) reduction catalyst comprising a compound of the formula (I):

$$ABOx \qquad (I)$$

wherein
x is >1.5 and ≤2.5,
A is independently selected from a transition metal of IUPAC groups 10 and 11, and
B is independently selected from a transition metal of IUPAC group 6, 7, 8 or 9 and
wherein the reduction catalyst has a resistivity of 0.05 to 3 μΩcm in a temperature range of 5 to 300 K.

13. The reduction catalyst according to claim 12, wherein the reduction catalyst is not nano-structured.

* * * * *